United States Patent [19]

Togawa

[11] Patent Number: 4,703,547
[45] Date of Patent: Nov. 3, 1987

[54] APPARATUS FOR ASSEMBLING A VEHICLE SUSPENSION MECHANISM

[75] Inventor: Zenta Togawa, Hiroshima, Japan

[73] Assignee: Mazda Motor Corporation, Hiroshima, Japan

[21] Appl. No.: 838,340

[22] Filed: Mar. 11, 1986

[30] Foreign Application Priority Data

Mar. 12, 1985 [JP] Japan .................................. 60-50209

[51] Int. Cl.[4] ............................................. B23P 19/04
[52] U.S. Cl. ......................................................... 29/227
[58] Field of Search .................... 29/215–221, 29/225, 227; 254/10.5

[56] References Cited

U.S. PATENT DOCUMENTS

| | | | |
|---|---|---|---|
| 4,486,935 | 12/1984 | Kashiwagi | 29/227 |
| 4,494,289 | 1/1985 | Matsuura | 29/227 |
| 4,520,543 | 6/1985 | Ito | 29/227 |
| 4,558,500 | 12/1985 | Kloster | 29/227 |

FOREIGN PATENT DOCUMENTS 59-12536 1/1984 Japan .

*Primary Examiner*—Robert C. Watson
*Attorney, Agent, or Firm*—Fleit, Jacobson, Cohn & Price

[57] ABSTRACT

An apparatus for assembling a coil spring on a damper strut to manufacture a damper strut assembly. The apparatus includes a clamp for holding the strut in a vertical direction with the lower end of the spring attached to a lower spring seat provided on the strut. A caliper type spring depresser is provided. The depresser is mounted on a plate for movement along a substantially vertical guide rail mechanism. The plate is swingable in a substantially vertical plane so that the direction of movement of the depresser can be adjusted so as to coincide with the direction of the axis of the spring.

6 Claims, 2 Drawing Figures

APPARATUS FOR ASSEMBLING A VEHICLE SUSPENSION MECHANISM

BACKGROUND OF THE INVENTION

1. Field of the Invention

The present invention relates to an apparatus for assembling a vehicle suspension mechanism, and more particularly to an apparatus for assembling a so-called strut-type vehicle suspension mechanism having a damper strut assembly comprised of a damper strut and a suspension coil spring. More specifically, the present invention pertains to a mechanism for compressing the coil spring in the process of assembling the suspension mechanism.

2. Description of Prior Art

In a strut type suspension mechanism, the coil spring is assembled on the damper strut in a pre-compressed condition. The coil spring is at first attached at one end to a seat provided at an intermediate portion of the strut, the other end extending upward beyond the upper end of the strut. At this stage, the piston rod of the strut is retracted into the cylinder body. The coil spring is then compressed by forcing the upper end downward and at the same time the piston rod is pulled upward to an extended position wherein the upper end of the piston rod projects beyond the upper end of the coil spring. Then, the piston rod is attached with an upper spring seat and a mounting block, and a nut is attached to the upper end of the piston rod. Thereafter, the coil spring is released so that its upper end is engaged with the upper spring seat to complete the strut assembly.

It will therefore be understood that the coil spring must without exception be compressed in the assembling procedure. In Japanese utility model application No. 57-108047 filed on July 14, 1982 and disclosed for public inspeciton on Jan. 26, 1984 under the disclosure No. 59-12536, there is disclosed an apparatus for compressing the coil spring in assembling the suspension mechanism. In the apparatus as disclosed by the Japanese utility model, the damper strut is held in a substantially vertical position with the lower end of the coil spring attached to the spring seat provided on the intermediate portion of the strut. A depresser assembly is provided for engagement with the upper side portion of the coil spring and movable in substantially vertical direction so that a downward movement of the depresser assembly causes a compression of the coil spring.

The depresser assembly includes a pair of caliper arms which are swingable in a substantially horizontal plane toward and away from the coil spring. The caliper arms are provided with radially inwardly projecting pawls which are adapted to be inserted into spaced between convolutions of the spring. The pawls engage the convolutions of the spring immediately below the pawls when the depresser assembly is moved downward to thereby compress the coil spring.

It has been found, however, that the apparatus as disclosed by the Japanese utility model is not satisfactory in that, in case where the pawls are offset from the axis of the spring, the spring cannot be evenly compressed so that it very often becomes difficult to have the upper end of the piston rod projected from the center of the upper end of the coil spring. Such misalignment causes difficulties in succeding procedures for mounting the upper spring seat and the mounting block on the piston rod. It should further be noted that the coil spring is usually mounted on the damper strut with the axis of the spring inclined with respect to the axis of the strut. Further, the angle of inclination of the spring axis is different among the car models. However, the apparatus as disclosed by the Japanese utility model cannot be accommodated for different types of suspension mechanisms having different angles of inclination of the spring axis. In recent car manufacturing plants, different types of cars are transferred in a single assembling line so that it is important to provide an apparatus which can be used for assembling different types of cars.

SUMMARY OF THE INVENTION

It is therefore an object of the present invention to provide an apparatus for assembling a vehicle suspension mechanism, which includes means for evenly compressing the suspension coil spring mounted on the damper strut.

Another object of the present invention is to provide an apparatus for compressing a coil spring of a strut type vehicle suspension mechanism, which can be used in different types of suspension mechanisms having different angles of inclination of the spring axis.

According to the present invention, the above and other objects can be accomplished by an apparatus for assembling a strut type suspension mechanism including a damper strut having a cylinder body and a piston rod, and a coil spring mounted on the strut with one end seated on a first spring seat provided on the cylinder body and the other end seated on a second spring seat provided on the piston rod, said apparatus including support means for supporting said strut so that the strut is held in a first direction, frame means mounted for swinging movement about an axis substantially perpendicular to said first direction, depresser means having means for engaging said coil spring of the suspension mechanism and movable in a second direciton which is not parallel with said axis of swinging movement of the frame means, adjusting means for positioning said frame means so that said second direction is substantially parallel with an axis of said coil spring. In a preferable arrangement, the axis of the swinging movement of the frame means is located to intersect the axis of the coil spring. In case where the axis of the coil spring is inclined with respect to the axis of the damper strut, the axis of the swinging movement of the frame means is preferably located to pass the intersection of the axes of the coil spring and the damper strut.

According to the features of the present invention, the direction of movement of the depresser means can be adjusted by swingably moving the frame means. It is therefore possible to make the directions of mevement of the depresser means aligned with the axis of the coil spring even when the inclination angle of the spring axis is changed. Thus, the coil spring can be compressed evenly until the upper end of the piston rod is projected from the center of the upper end of the coil spring.

The above and other objects and features of the present invention will become apparent from the following descriptions of a preferred embodiment taking reference to accompanying drawings.

DESCRIPTION OF THE PREFERRED EMBODIMENT

Figure 1:
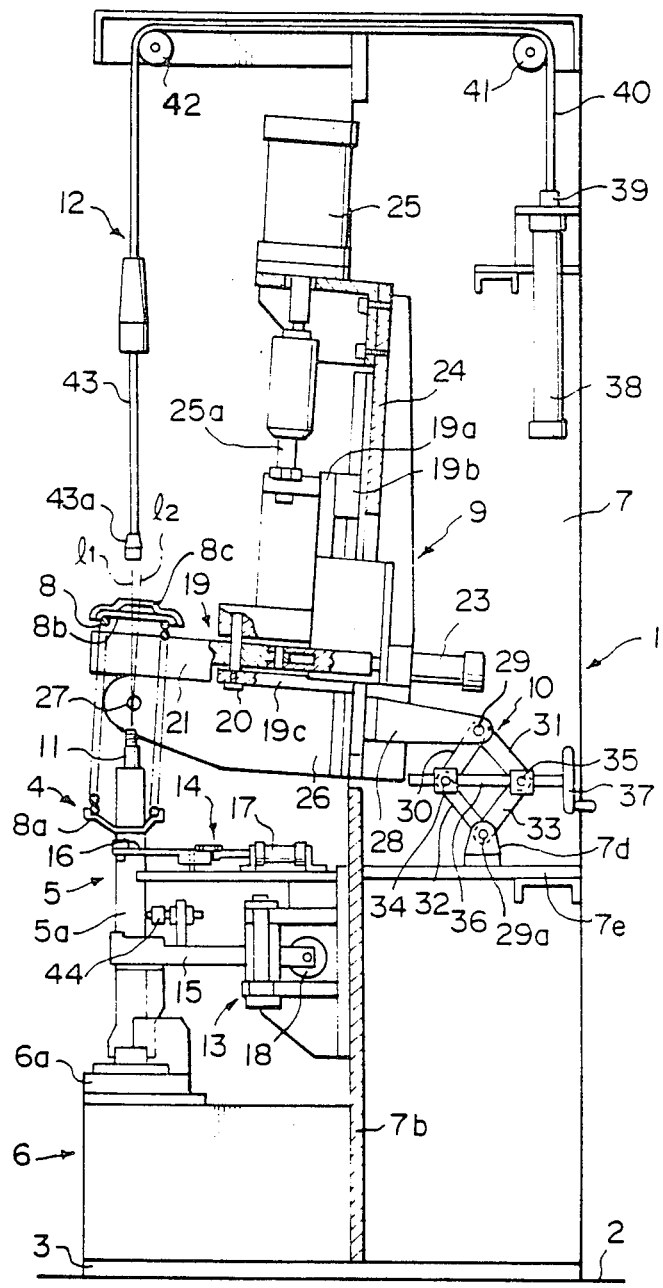
FIG. 1 is a partially cut-away side view of the suspension assembling apparatus in accordance with one embodiment of the present invention; and, FIG. 2 is a plan view of the depresser assembly.

Referring to the drawings, particularly to FIG. 1, thre is shown a vehicle suspension assembling apparatus 1 which includes a base 3 adapted to be placed on the floor 2. On the base 3, there is provided a lower support frame 6 on which a supporting block 6a is carried for supporting the bottom end of a damper strut 5 of a strut assembly 4. The base 3 further has an upright frame 7 including a pair of side walls 7a and a transverse wall 7b extending between the side walls 7a shown in FIG. 2. The side walls 7a of the upright frame 7 are provided at the front end portions with bearings 7c. A swingable frame 9 having a main frame wall 9a and a pair of forwardly extending arms 26 are supported at the front end portions of the arms 26 by means of pins 27 which are provided at the front end portions of the arms 26 and journalled by the bearings 7c. The frame 9 further has a rearwardly extending arm 28 which is connected with a driving mechanism 10. As shown in FIG. 1, the driving mechanism 10 includes a pair of upper links 30 and 31 which are connected at one ends with the arm 28 through a pivot pin 29. The other ends of the links 30 and 31 are pivotably connected with one ends of links 32 and 33, respectively. The other ends of the links 32 and 33 are connected through a pivot pin 29a to a bracket 7d located on a horizontal table 7e which is provided on the frame 7. Thus, it will be understood that a pantagraph mechanism is provided by the links 30, 31, 32 and 33. A nut 34 is mounted at the connection between the links 30 and 32 and a nut 35 is mounted at the conneciton between the links 31 and 33. A screw shaft 36 having a handle 37 is threadably engaged with the nuts 34 and 35. The nuts 34 and 35 are oppositely threaded so that the heightwise level of the rear end of the arm 28 can be adjusted by rotating the screw shaft 36. Thus, the frame 9 can be moved swingably about the axis of the pivot pin 27 in response to an actuation of the handle 37.

The transverse wall 7b of the frame 7 carries a lower strut clamping mechanism 13 and an upper sturt clamping mechanism 14. The strut 5 includes a cylinder body 5a and a piston rod 11 projecting from the upper end of the cylinder body 5a. The upper clamping mechanism 14 has a pair of clamp arms 16 adapted to hold the cylinder body 5a of the strut 5 and a pneumatic cylinder 17 for actuating the clamp arms 16 between a clamping position and a releasing position. The lower clamping mechanism 13 also has a pair of clamping arms 15 adapted to hold the cylinder body 5a and a pneumatic cylinder 18 for actuating the clamp arms 15 between a clamping position and a releasing position.

As shown in FIG. 1, the strut assembly 4 has a coil spring 8 adapted to the placed around the upper portion of the strut 5. For the purpose, the strut 5 is provided with a lower spring seat 8a secured to the cylinder body 5a. The spring 8 is seated at the lower end on the lower spring seat 8a and at the upper end on an upper spring seat 8b provided on a mounting block 8c. In assembling the strut assembly 4, the upper spring seat 8b and the mounting block 8c are removed and the spring 8 is compressed until the upper end of the piston rod 11 is projected from the upper end of the coil spring 8. In order to compress the coil spring 8, a depresser mechanism 19 is provided.

Figure 2:
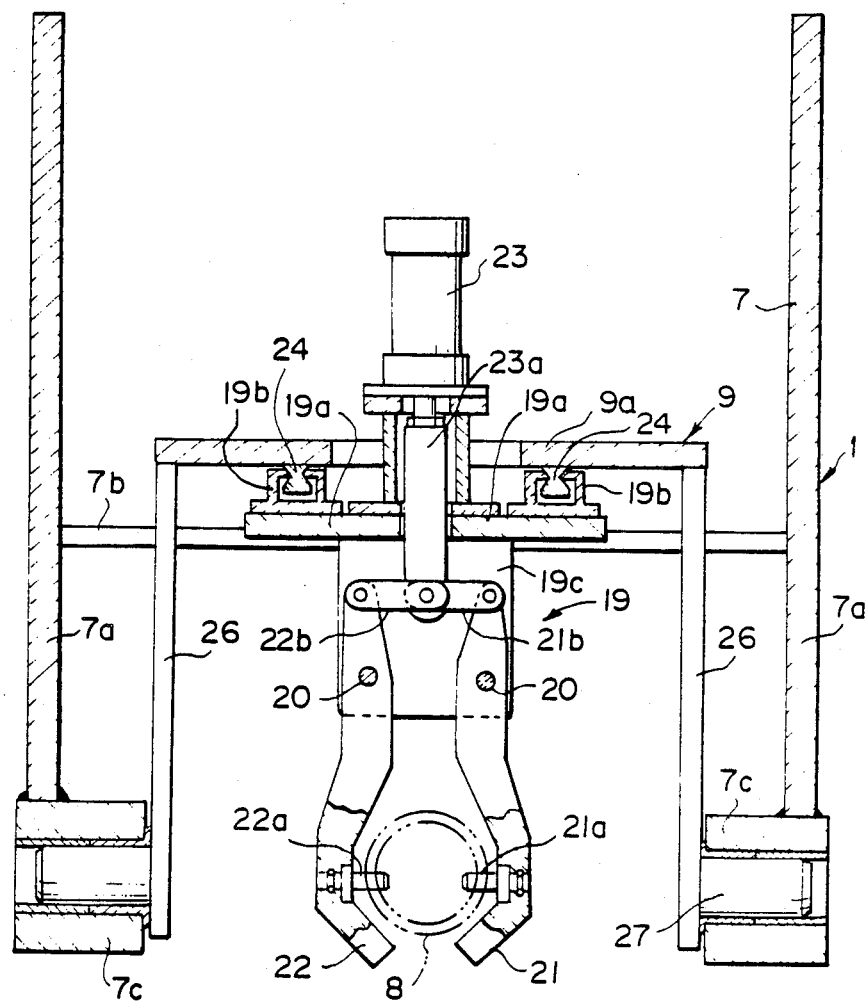

As shown in FIG. 2, the main frame wall 9a of the swingable frame 9 is provided with a pair of guide rails 24. The depresser mechanism 19 includes a plate 19a having slide shoes 19b which are adapted to slide along the guide rails 24. The plate 19a is provided at the lower end with a forwardly extending support table 19c on which a pair of caliper arms 21 and 22 are mounted as shown in FIG. 2 by means of pivot pins 20 for pivotable movement substantially in a horizontal plane. The caliper arms 21 and 22 are respectively provided at the front end portions with radially inwardly projecting pins or pawls 21a and 22a which are adapted to be inserted into spaces between adjacent convolutions of the spring 8. The rear end of the caliper arm 21 is connected with one end of a link 21b. Similarly, the rear end of the caliper arm 22 is connected with one end of a link 22b. The other ends of the links 21b and 22b are connected to the free end of a piston rod 23a of a pneumatic cylinder 23 which is carried on the plate 19a. It will therefore be understood that the forward ends of the caliper arms 21 and 22 can be opened and closed by operating the actuator 23.

In order to move the plate 19a along the guide rails 24, there is provided a pneumatic cylinder 25 which is mounted on the swingable frame 9. The cylinder 25 has a piston rod 25a connected with the plate 19a so that an actuation of the pneumatic cylinder 25 causes a vertical movement of the plate 19a and therfore the vertical movement of the caliper arms 21 and 22.

As shown in FIG. 1, the strut 5 has a longitudinal axis 11 and the coil spring 8 has a longitudinal axis 12 which is inclined with respect to the axis 11. It is preferable, for the purpose of compressing the coil spring 8 evenly, that the direction of movement of the caliper arms 21 and 22 coincides with the direction of the axis 12 of the coil spring 8. The adjustment of the inclination of the guide rails 24 can be mad by operating the handle 37 which rotates the screw shaft 36 so that the guide rails 24 be directed substantially parallelly with respect to the direction of the spring axis 12. It is preferable that the bearings 7c be located so that the axis of the pivot pins 27 pass through the intersection between the axis 11 and 12.

In order to pull out the piston rod 11 of the damper strut 5, there is provided a pulling mechanism 12 which includes an adapter 43a which is adapted to be engaged with an externally threaded upper end portion of the piston rod 11. The adapter 43a is connected with a pulling arm 43 which is in turn connected with one end of a cable 40 which is passed around pulleys 41 and 42 and connected at the other end with a piston rod 39 of a pneumatic cylinder 38. The cylinder 38 is mounted on the frame 7 so that an operation of the cylinder 38 causes an upward movement of the adapter 43a.

In operation, the strut 5 is placed by putting its bottom on the supporting block 6a and holding the cylinder body 5a by the clamping mechanisms 13 and 14. The spring 8 is attached at the lower end to the lower spring seat 8a leaving the upper end free. A sensor 44 is provided for confirming that the strut 5 is properly positioned. At this position, the axis 11 of the strut 5 is aligned with the axis of the pulling arm 43.

Thereafter, the handle 37 is actuated so that the direction of the guide rails 24 is brought into parallel with the axis 12 of the spring 8. Then, the cylinder 23 is actuated to have the front ends of the caliper arms 21 and 22 closed and the pawls 21a and 22a engaged with the spring 8. The pneumatic cylinder 25 is then operated to move the mechanism 19 downward so as the compress the coil spring 8. The cylinder 38 is further operated to lower the pulling arm 43 and connect the adapter 43a to the upper end of the piston rod 11. Thereafter, the cylinder 38 is operated in the reverse direction to pull up the arm 43 and therefore the piston rod 11. Thus, the piston rod 11 is projected beyond the upper end of the coil spring 8.

The adapter 43a is then disconnected from the piston rod 11, and the upper spring seat 8b and the mounting block 8c are placed on the upper end of the spring 8. At this position, the upper end of the piston rod 11 projects through the upper spring seat 8b and the mounting block 8c. Thereafter, a nut is threaded onto the upper end of the piston rod 11 to complete the assembling of the strut assembly 4.

The invention has thus been shown and described with reference to a specific embodiment, however, it should be noted that the invention is in no way limited to the details of the illustrated structures but changes and modifications may be made without departing from the scope of the appended claims.

What is claimed is:

1. An apparatus for assembling a strut type suspension mechanism including a damper strut having a cylinder body and a piston rod, and a coil spring mounted on the strut with one end seated on a first spring seat provided on the cylinder body and the other end seated on a second spring seat provided on the piston rod, said apparatus including support means for supporting said strut so that the strut is held in a first direction, frames means mounted on said support means for swinging movement about an axis substantially perpendicular to said first direction, depresser means having means for engaging said coil spring of the suspension mechanism and movable in a second direction which is not parallel with said axis of swinging movement of the frame means, adjusting means for positioning said frame means so that said frame means adjusts said second direction such that the second direction is substantially parallel with an axis of said coil spring.

2. An apparatus for assembling a strut type suspension mechanism including a damper strut having a cylinder body and a piston rod, and a coil spring mounted on the strut with one end seated on a first spring seat provided on the cylinder body and the other end seated on a second spring seat provided on the piston rod, said apparatus including support means for supporting said strut so that the strut is held in a first direction, frame means mounted on said support means for swinging movement about an axis substantially perpendicular to said first direction, depresser means having means for engaging said coil spring of the suspension mechanism and movable in a second direction which is not parallel with said axis of swinging movement of the frame means, adjusting means for positioning said frame means so that said second direction is substantially parallel with an axis of said coil spring, said axis of the swinging movement of said frame means being located to intersect the axis of the coil spring.

3. An apparatus in accordance with claim 1 in which said adjusting means includes a pantograph mechanism for effecting the swiging movement of the frame means.

4. An apparatus for assembling a strut type suspension mechanism including a damper strut having a cylinder body and a piston rod, and a coil spring mounted on the strut with one end seated on a first spring seat provided on the cylinder body and the other end seated on a second spring seat provided on the piston rod, said apparatus including support means for supporting said strut so that the strut is held in a first direction, frame means mounted on said support means for swinging movement about an axis substantially perpendicular to said first direction, depresser means having means for engaging said coil spring of the suspension mechanism and movable in a second direction which is not parallel with said axis of swinging movement of the frame means, adjusting means for positioning said frame means so that said second direction is substantially parallel with an axis of said coil spring, said depresser means including guide rail means provided on said frame means to extend in said second direction and sliding shoe means slidable along said guide rail means and carrying said engaging means.

5. An apparatus in accordance with claim 1 in which said engaging means of the depresser means includes a pair of caliper arms located at the opposite sides of the spring and swingable toward and away from the spring, pneumatic actuator means being provided for effecting movements of the caliper arms.

6. An apparatus in accordance with claim 1 which further includes means for pulling the piston rod in the first direction.

* * * * *